Oct. 10, 1950 K. R. WENDT 2,525,106

ELECTRONIC KEYER FOR DIRECT CURRENT RESTORATION

Filed Nov. 21, 1946 2 Sheets-Sheet 1

INVENTOR
KARL R. WENDT
BY H. S. Grover
ATTORNEY

Oct. 10, 1950 K. R. WENDT 2,525,106

ELECTRONIC KEYER FOR DIRECT CURRENT RESTORATION

Filed Nov. 21, 1946 2 Sheets-Sheet 2

INVENTOR
KARL R. WENDT
BY [signature]
ATTORNEY

Patented Oct. 10, 1950 2,525,106

UNITED STATES PATENT OFFICE 2,525,106

ELECTRONIC KEYER FOR DIRECT CURRENT RESTORATION

Karl R. Wendt, Hightstown, N. J., assignor to Radio Corporation of America, a corporation of Delaware Application November 21, 1946, Serial No. 711,434

1 Claim. (Cl. 178—7.3)

The present invention relates to an improvement in electric keyers and more particularly to circuit arrangements to be used in setting the direct current level in a television transmitter or receiver.

The use of a direct current level setter, or the insertion of the direct current component, is desirable at a television transmitter in order that complete picture information may be transmitted and in order that a satisfactory automatic gain control circuit may be incorporated in a remotely located receiver. This direct current insertion is generally performed in the latter stage or stages of the transmitter in order that the average carrier amplitude may be caused to fluctuate in accordance with the average brilliance of the television image. A circuit arrangement for inserting the direct current component in a television transmitter is shown and described in my copending application, Serial No. 711,435, filed Nov. 21, 1946 entitled "Television System." Direct current insertion or direct current level setting is made necessary by reason of the fact that resistance-capacitance coupled amplifiers are conventionally employed and the direct current level is lost in passing through the stages of such amplifiers. After the direct current level has been re-established at a television transmitter, and in compliance with the U. S. standards of transmission, the synchronizing signals are then always transmitted at approximately full carrier amplitude or 100% carrier intensity. The black level or blanking impulses are transmitted at approximately 75% of full carrier amplitude and the image intelligence is represented by carrier amplitude variations ranging from zero or a small percentage (in the case of white) to nearly 75% of full carrier amplitude (in the case of black).

In a television receiver, direct current insertion is also necessary especially if resistance-capacitance coupled video amplifiers are employed in the receiver since the direct current component is lost from the video signal in passing through such amplifiers. Due to the insertion of the direct current component at the transmitter, however, and by reason of the fact that the blanking impulses are also transmitted at black level, the receiver then has available some information from which the direct current level can again be established. Prior to the establishment of the proper direct current level, the entire video signal inherently centers itself about an A. C. axis so that, in the absence of direct current insertion, predominately black images would not appear black on the screen of the television receiver image tube, but, instead, would appear grayish. Similarly, predominately white images, without direct current insertion, would appear grayish since the receiver would tend to maintain substantially uniform average brilliance of the image regardless of its actual average light intensity. Since the blanking impulses, as received at the television receiver, always correspond to black, a circuit arrangement may be provided for establishing the proper direct current potential level at the grid of the image producing tube or kinescope during the transmission of the blanking impulse so that video signals that follow each blanking impulse and represent one line of the image may cause proper potential modulations of the control electrode of the electron gun in the kinescope to produce images having the proper average light intensity. Various circuit arrangements have been employed for establishing the direct current level and in each case the direct current level setter or the circuit arrangement for providing direct current insertion responds to the video signal intensity during the blanking impulses or the synchronizing signal intervals.

In the present invention, a keyed type direct current level setter is employed which may be used in either a television transmitter or a television receiver for establishing the desired direct current level. In the circuit arrangement, there are provided a pair of electron discharge paths, in the form of diodes, which are keyed into conducting condition during the desired spaced intervals. By means of the circuit arrangement, the average potential of the control electrode of a tube whereat the direct current level is established, may be set in accordance with any desired potential to obtain the desired results, without the necessity of resorting to complicated and involved potential sources.

It is, therefore one purpose of the present invention to provide a new and improved circuit arrangement for establishing the direct current level in a television transmitter or receiver.

Another purpose of the present invention resides in the provision of a circuit arrangement which may be keyed into conducting condition at predetermined intervals to properly establish the desired potential level at an electron discharge tube in a television transmitter or receiver to thereby establish the proper direct current operating level.

A still further purpose of the present invention resides in the provision of a keyed direct current level setter for use in a television transmitter or receiver in which desired potential levels may be established at an electron discharge tube without the necessity of providing complicated or involved potential sources.

A still further purpose of the present invention resides in the provision of a keyed diode direct current level setter in which the potential level of the control electrode in an electron discharge device may be set at a potential which is different from the electrical balance point of the diode level setting circuit.

Various other purposes and advantages of the present invention will become more apparent to those skilled in the art from the following detailed description particularly when considered with the drawings wherein like reference numerals represent like parts and wherein.

Figure 1:
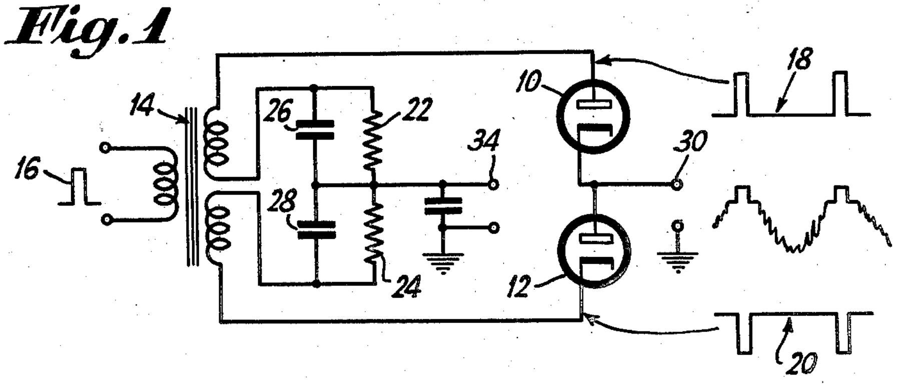
Figure 1 represents a form of a keyed direct current level setter in which potential regulation is not employed.

Referring now to the drawings and particularly to Figure 1 thereof, there is shown a pair of keyed diodes and a circuit arrangement such as is shown and described in my above referred to U. S. Patent application Serial No. 711,435. In this arrangement, a pair of diodes 10 and 12 are provided which are supplied with impulses from the secondary windings of transformer 14. The primary of the transformer 14 is supplied with keying impulses having a waveform such as represented at 16 and these impulses produce corresponding impulses at the anode of diode 10 as represented by the curve 18 and at the cathode of diode 12 as represented by the curve 20. It will be observed that pulses at the anode of diode 10 extend in a positive direction whereas the pulses at the cathode of diode 12 extend in a negative direction. The other ends of the secondaries of the transformer 14 are connected together by series resistances 22 and 24, each of which is paralleled by a condenser 26 and 28, respectively. The cathode of diode 10 and the anode of diode 12 are connected together and in turn are connected to terminal 30. Assuming the diodes to be conducting, when a voltage variation, such as represented at 32, is applied between terminal 30 and ground, a potential is obtainable between terminal 34 and ground, terminal 34 being connected to the junction of resistances 22 and 24. The intensity of the potential available at terminal 34 depends upon the potential applied to terminal 30 during the instant that the diodes are rendered conductive. If, for example, the waveform 32 is a television video waveform and if the keying impulses are phased with the synchronizing intervals of waveform 32, then the potential at terminal 34 will correspond approximately to the potential existing at terminal 30 during the synchronizing intervals. For proper operation of this circuit it is desirable that the resistances 22 and 24 be made substantially equal and it is also desirable that the amplitude of the impulses applied to the diodes be equal. Since the relative amplitudes of the pulses applied to the diodes is a function of the relative turns on the two secondary windings, their amplitudes can be made equal. Variations in the input impulse intensity of waveform 16 do not affect the relative amplitudes of the pulses applied to the diodes, and similarly, simultaneous and equal changes in the amplitude of the pulses applied to the diodes have no net effect on the potential at the terminal 34, provided resistances 22 and 24 are substantially equal, as indicated above. Accordingly, a variation in the amplitude of the triggering impulse 16 does not appreciably affect the potential available at terminal 34.

There are instances when it is desirable to have available at terminal 34, for example, a potential which is commensurate with, but not identical to, the potential applied to the terminal 30 during the keying intervals. In other words, it may be desirable to have the potentials vary in like manner, yet be considerably different so far as their actual voltage levels are concerned. Under these circumstances it has heretofore been customary to provide series potential sources for shifting the potential levels, or other complicated and involved potential sources for performing the same function. In accordance with the present invention, however, this may be accomplished directly by an arrangement as shown, for example, in Figure 2.

Figure 2:
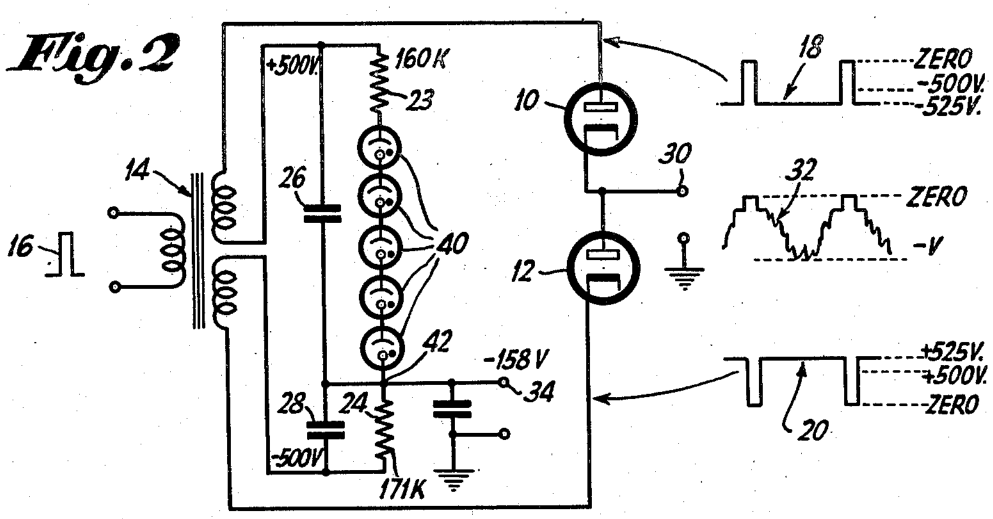
Figure 2 represents a preferred form of the present invention.

In Figure 2, there is shown an impulse transformer 14 and a pair of diodes 10 and 12 similar to the corresponding elements in Figure 1. One of the secondaries of the transformer 14 supplies positive impulses (as represented by the waveform 18) to the anode of diode 10 while the other secondary supplies negative impulses (as represented by the waveform 20) to the cathode of the diode 12. The other ends of each of the secondary windings are connected together by means of a resistance 23, a series of gas discharge devices 40 and a resistance 24. Junction point 42, between the discharge devices 40 and the resistance 24, is connected to output terminal 34. This same junction point 42 is also connected to one terminal of each of condenser 26 and 28 which are connected in series as in Figure 1. An input terminal 30 is provided and this terminal is connected to the cathode of diode 10 and the anode of diode 12. A waveform such as represented at 32 is applied to the terminal 30 and if the waveform represents, for example, a television video signal including synchronizing signals and if the keying impulses are in phase with the synchronizing impulses, then the voltage available at the terminal 34 is a function of, but not identical to, the potential that exists during the synchronizing intervals in the waveform 32. For convenience, all of these potentials are related to ground potential.

Figure 4:
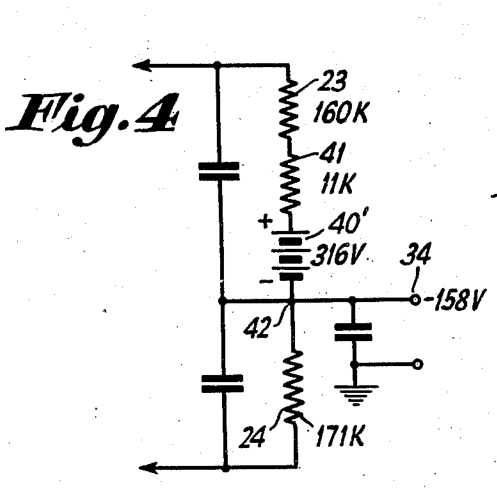
Figure 4 represents the electrical equivalent of a portion of Figure 2.
Figure 3:
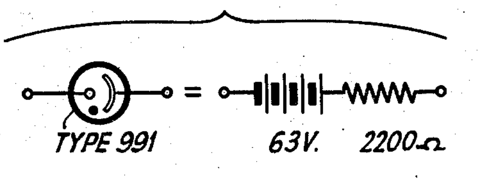
Figure 3 shows a gas discharge tube and its equivalent electrical components.

The gas discharge device 40 may be in the form of neon tubes, or they may, for example, be tubes such as tube type 991, and such a tube is represented in Figure 3. This particular tube may be looked upon as representing a potential source of approximately 63 volts in series with a 2200 ohm resistance. If five such discharge devices are connected in series as in Figure 2 then such an arrangement may be considered as electrically equivalent to the arrangement shown in Figure 4, in which the source of potential 40' is approximately 316 volts and is represented in series with a resistance 41 of 11,000 ohms. The potential drop across a gas discharge device is not absolutely constant but depends to some extent upon the current flow. In tube type 991, for example, the potential drop is approximately 63 volts when the tube is passing two milliamperes. The potential drop may vary between 58 and 63 volts for a current variation of from one to two milliamperes and for this reason, as well as because of information obtained by measurements taken in an actual working embodiment, the voltage drop across five such tubes is indicated as being 316 volts rather than 315 volts (5 times 63). The five discharge tubes are connected in series with the resistance 23, and, for best operation of the circuit, it is desirable to maintain the resistance-component on each side of the junction point 42 substantially balanced so that the value of the resistance 23 should be decreased by 2200 ohms for each discharge device that is added to the series. In Figure 4, for example, the resistance 23 of 160,000 ohms, in series with the resistance 41 of 11,000 ohms is equivalent to the resistance 24 of 171,000 ohms. When the discharge devices are included in the circuit arrangement represented in Figure 2, then the potential as present at terminal 34 is different from the potential that exists at terminal 30 during the keying intervals, but varies in accordance therewith.

By way of explanation, circuit and voltage values have been applied to the diagram of Figure 2 and, for convenience, it is assumed that the potential represented by the waveform 32, that is being measured, is at ground potential during the intervals of the keying impulses. Assuming for the moment that the circuit was as that represented in Figure 1 without the gas discharge devices, it can be seen that with resistance 22 equivalent to the resistance 24 and with balanced impulses applied to the diodes, the potential at terminal 34 would be zero and would remain so even if the voltage at the anode of diode 10 and at the cathode of diode 12 were to vary as a result of variation in input impulse amplitude.

Any attempt to use a portion of the voltage developed across resistance 22 or 24 would result in a voltage that would vary with driving pulse amplitude since the keying impulses that are applied to the diodes would not be balanced electrically. However, if a battery or source of potential were inserted in series with resistance 22 (as is shown in Figure 4, for example) then the voltage at terminal 34 would be changed by an amount equivalent to one half of the electromotive force of the battery so long as the resistance component on each side of the junction point 42 remains identical and so long as the pulses remain balanced and sufficiently large. Under such conditions, the voltage at terminal 34 would not be that which would normally be developed but would be equivalent to one half the potential of the battery and would not be affected by variations in the amplitude of the impulses that are applied to the input of the transformer 14. Rather than use a battery or actual potential source which frequently is difficult and troublesome to provide in commercial equipment, a series of gas discharge devices 40 may be employed, and it is this arrangement that is represented in Figure 2. If five such devices are used, they collectively represent 11,000 ohms and such a value of resistance is deducted from the resistance 22 normally provided so that the remaining resistance is represented by the resistor 23. Under these conditions, the network remains balanced. The five tubes (if five are used) then are equivalent to a 316 volt battery. The voltage appearing at terminal 34, however, is only half of this value, or 158 volts. The reason for this division of voltage and the appearance of only one-half the voltage to which the discharge devices are equivalent at the terminal 34 will be apparent upon a further examination of Figure 2. Assume that the pulses at the anode of diode 10 and at the cathode of diode 12 are each 525 volts, peak-to-peak, as represented by curves 18 and 20, and are 5% wide. Since the voltage at the input terminal 30 is zero (during keying), the peaks of the pulses are also at zero potential (neglecting the impedance of the diodes). The A. C. axis of each voltage is, therefore, 95% of the peak-to-peak voltage, or 500 volts plus and minus from ground. The voltage on the other ends of the transformer secondaries is then the A. C. axis voltage only or +500 volts at the transformer end of resistance 23 and −500 volts at the transformer end of resistance 24, as represented in Figure 2. The direct current through the circuit composed of the diodes 11 and 12, the resistances 23 and 24 and the discharge devices 40 is equivalent to the net applied voltage divided by the effective resistance. The net applied voltage is 500+500−316 or 684 volts, while the effective resistance is 160,000+11,000+171,000 or 342,000 ohms. The resultant direct current flow through the circuit is then 2 milliamperes. The voltage at terminal 34 is then −500 volts, plus the drop across resistance 24 (.002×171,000), which equals −158 volts. This is one-half of 316 volts, the electrical equivalent of the assumed five series connected discharge devices 40. If other than the entire voltage across the discharge devices 40 is used, or if the other polarity of voltage is used, the 11,000 ohms equivalent resistance of the discharge devices 40 may be appropriately divided on each side of the junction point 42.

If the keying pulses from the transformer secondaries are not balanced, the circuit of Figure 2 may be divided about its hypothetical electrical balance point (which may fall within the gas discharge devices 40) and in such a case, all values on the two sides of such a balance point are made proportional to the size of the pulses. Preferably, however, it is desirable to so design the transformer 14 that the driving pulses 18 and 20 are balanced.

It may be seen, therefore, that with an applied waveform such as repesented at 32 and with the applied voltage at zero during the keying intervals, the voltage obtainable at terminal 34 is not zero but is −158 volts with respect to ground (when the assumed number of five discharge tubes are used), and any change in the applied voltage during the keying intervals is reflected into the voltage appearing at the output terminal 34 in like amount and direction. If a different voltage, or a voltage of opposite polarity is desired, it is only a matter of properly choosing the correct number of gas discharge devices and locating the proper number on the proper side or sides of the junction point 42. The resistance component on each side of the junction should preferably be maintained equal.

The particular circuit arrangement of Figure 2 is directly applicable to a direct current insertion device such as shown and described in my above mentioned U. S. patent application and when such an arrangement is used, then the source of potential 68 in that U. S. patent application disclosure may be omitted, provided an appropriate number of gas discharge devices are employed.

The use of such an arrangement similar to that described above is also applicable in instances where it is desired to key a circuit to a given potential level. Such circuits are represented, by way of example, in Figures 5 and 6 of the accompanying drawings.

Figure 5:
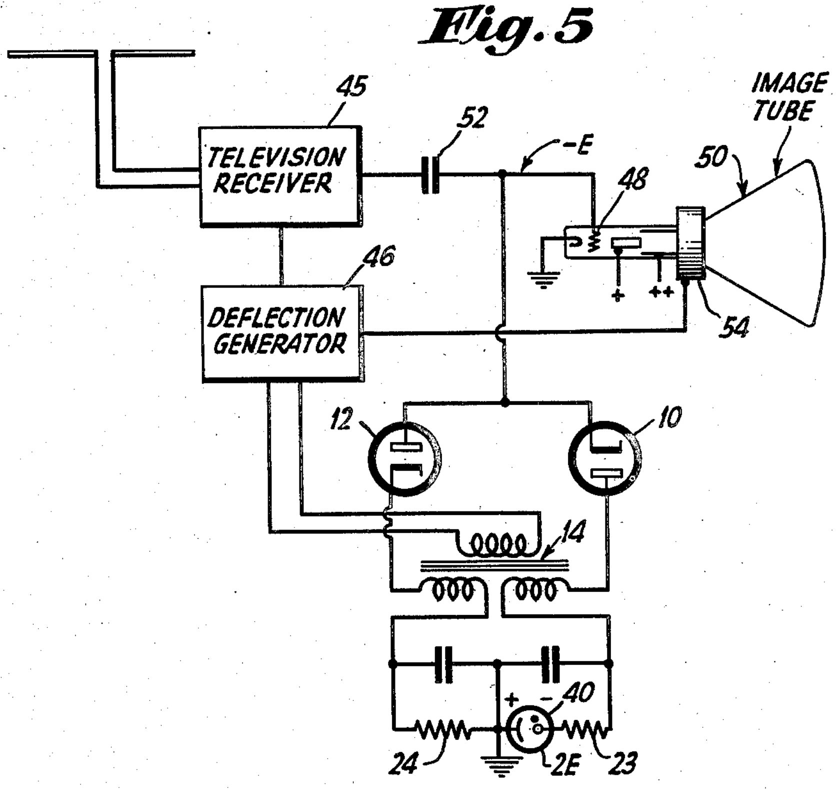
Figure 5 shows a form of the present invention for use in connection with a television receiver image reproducing tube.

In Figure 5, for example, a television receiver is diagrammatically shown in which the receiver proper is represented at 45 while the deflection generator is represented at 46. Video signals from the television receiver 45 are applied to the control electrode 48 of an image reproducing tube 50 by way of coupling condenser 52. Deflection voltages are supplied from the deflection generator 46 to the deflection coils 54. The deflection generator also supplies keying pulses of an appropriate magnitude to the primary of transformer 14 while the two secondaries supply appropriate pulses to the cathode of diode 12 and the anode of diode 10. The opposite ends of each of the two secondaries are connected together by way of resistance 24, gas discharge device 40 and resistances 23, with the junction of the resistances 24 and the gas discharge device 40 being connected to ground. If the pulses as supplied from the deflection generator are in phase with the synchronizing pulses of the video signal supplied to the control electrode 48 of the image tube 50, then the direct current potential of the control electrode 48 will be established at a potential level equal to one half the equivalent electrical potential represented by the gas discharge device 40. If, for example, the gas discharge device represents a potential 2E, poled as indicated in Figure 5, then the direct current potential that is established at the control electrode 48 during each keying interval, i. e., during each synchronizing interval, is equivalent to —E. Such an arrangement could, therefore, be readily used to insert the direct current component in a television receiver and by appropriately determining the potential of the cathode of the electron gun structure in the image reproducing tube 50 by means of a potentiometer or similar device (not shown—cathode grounded for simplicity) the background level control may be provided. When once an appropriate adjustment is made then this particular level will be maintained regardless of the character of the received signals through the functioning of the keyed level setter and the use of the gas discharge device 40. Such an arrangement permits establishment of a potential at a control electrode that is different from the reference potential (which may be ground as in Figure 5) without the necessity of providing a separate potential source.

Figure 6:
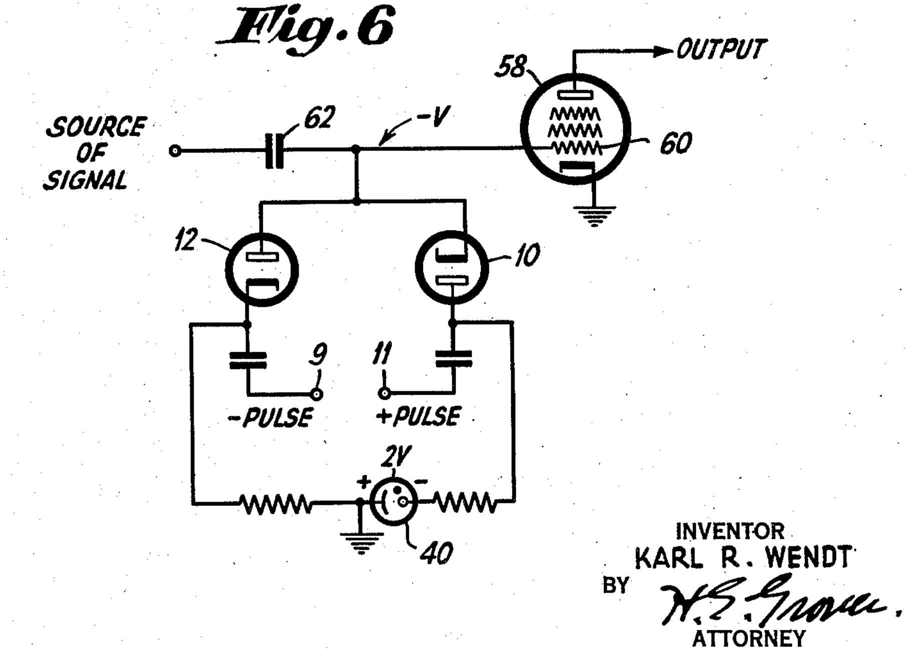
Figure 6 shows a form of the subject invention as applied to a video signal amplifier tube.

A somewhat similar arrangement is shown in Figure 6 wherein a pair of diodes 10 and 12 are provided and are keyed into conduction by pulses applied to the terminals 9 and 11. For simplicity, the keying transformer 14 has not been shown. An electron discharge tube 58 is also shown having an input control electrode 60 to which modulating potentials or signals are applied by way of coupling condenser 62. If it is desired to key the control electrode 60 at a potential such that the use of a gas discharge device as, for example, tube 991 could be used, then an arrangement such as in the Figure 5 would be employed. If, for example, the discharge device 40 is positioned poled as indicated in Figure 6, and if its equivalent potential is 2V, then the direct current potential of the control electrode 60 will be maintained at —V volts during the keying intervals and the signals applied to the control electrode by way of coupling condenser 62 will be related to this voltage level. Such an arrangement could, for example, be used in connection with the final video amplifier stage in a television receiver provided a direct current connection is made between the anode or output electrode of tube 58 and the control electrode of the image producing tube of the receiver.

From the foregoing it may be seen, therefore, that a keying device has been provided wherein substantially any desired direct current bias potential may be established at an electron discharge device even though such a potential is not directly available from any of the associated circuits. The provision of the gas discharge devices eliminates the necessity of providing potential sources that are unusual with respect to ground and which, in commercial applications, might prove difficult to provide and might unnecessarily complicate the power supply. By proper choice of the number, location and polarity of the gas discharge devices, any desired potential condition may be established and may be controlled in accordance with applied signals.

It should be noted that, for example in the illustration of Figure 2, the input voltage in the form of the signal is applied at point 30 to establish the effect of a controlled output potential at point 34. Nevertheless, it is often just as feasible to operate the circuit in a reverse manner to transfer a potential instead from point 34 to point 30. Actually, the direction of transfer of voltage depends upon the relative impedance values of the circuit elements connected to these two points.

Having now described the invention, what is claimed is:

A circuit arrangement for establishing the direct current level at the control electrode of an electron discharge tube in a television system comprising a source of video signals interspersed with black level signals, means including a condenser to apply the video and black level signals to the control electrode, a circuit arrangement having two normally non-conducting paths extending between the control electrode of the tube whereat the direct current level is to be established and a point of fixed potential, each of said paths including a diode and a resistance element connected in series, the resistance component of each path being substantially identical to that of the other, one of said paths including, in addition, a gas discharge tube in series with the diode and resistance element in that path, and means for simultaneously rendering both paths conducting at predetermined regularly recurring spaced intervals coinciding with the occurrence of the black level signals to charge said condenser during the conducting intervals to a potential differing by a predetermined amount from said fixed potential.

KARL R. WENDT.

REFERENCES CITED

The following references are of record in the file of this patent:

UNITED STATES PATENTS

| Number | Name | Date |
|---|---|---|
| 2,240,420 | Schnitzer | Apr. 29, 1941 |
| 2,258,732 | Blumlein | Oct. 14, 1941 |
| 2,286,450 | White | June 16, 1942 |
| 2,299,945 | Wendt | Oct. 27, 1942 |
| 2,303,909 | Blumlein | Dec. 1, 1942 |
| 2,358,545 | Wendt | Sept. 19, 1944 |
| 2,363,813 | Somers | Nov. 28, 1944 |
| 2,389,025 | Campbell | Nov. 13, 1945 |
| 2,445,040 | Schade | July 13, 1948 |

FOREIGN PATENTS

| Number | Country | Date |
|---|---|---|
| 512,109 | Great Britain | July 2, 1935 |
| 868,498 | France | Dec. 31, 1941 |
| 847,676 | France | Oct. 13, 1939 |